(12) United States Patent
Glynn et al.

(10) Patent No.: US 9,670,752 B2
(45) Date of Patent: Jun. 6, 2017

(54) SYSTEM AND METHOD FOR DELIVERING PROPPANT TO A BLENDER

(71) Applicant: Oren Technologies, LLC, Houston, TX (US)

(72) Inventors: Peter Glynn, Houston, TX (US); Joshua Oren, Houston, TX (US)

(73) Assignee: OREN TECHNOLOGIES, LLC, Houston, TX (US)

( * ) Notice: Subject to any disclaimer, the term of this patent is extended or adjusted under 35 U.S.C. 154(b) by 0 days.

(21) Appl. No.: 14/854,622

(22) Filed: Sep. 15, 2015

(65) Prior Publication Data

US 2016/0355346 A1 Dec. 8, 2016

Related U.S. Application Data

(60) Provisional application No. 62/050,752, filed on Sep. 15, 2014, provisional application No. 62/217,117, filed on Sep. 11, 2015.

(51) Int. Cl.
| | |
|---|---|
| *B60P 1/00* | (2006.01) |
| *E21B 41/00* | (2006.01) |
| *B65G 47/19* | (2006.01) |
| *B65G 65/42* | (2006.01) |

(52) U.S. Cl.
CPC .............. *E21B 41/00* (2013.01); *B65G 47/19* (2013.01); *B65G 65/42* (2013.01)

(58) Field of Classification Search
CPC ....................................................... B60P 1/00
USPC .......... 414/222.01, 287, 334, 406, 522, 523, 414/813; 222/185.1, 371; 198/538, 539, 198/540, 543, 544
See application file for complete search history.

(56) References Cited

U.S. PATENT DOCUMENTS

| | | |
|---|---|---|
| 137,871 A | 4/1873 | Worsley |
| 150,894 A | 5/1874 | Safely |
| 384,443 A | 6/1888 | Hoover |
| | (Continued) | |

FOREIGN PATENT DOCUMENTS

| | | |
|---|---|---|
| CA | 2023138 | 2/1992 |
| CA | 2791088 | 3/2013 |
| | (Continued) | |

OTHER PUBLICATIONS

US 2002/0134550 A1, Sep. 26, 2002, Leeson et al.*

(Continued)

*Primary Examiner* — Douglas Hess
(74) *Attorney, Agent, or Firm* — Hogan Lovells US LLP

(57) ABSTRACT

A system for conveying proppant includes a conveyor system having a conveyor belt, the conveyor belt receiving proppant from one or more containers having proppant stored therein distributed along the conveyor system and carrying the proppant away from the conveyors. The system also includes a conveyor assembly having one or more joints to enable expansion and collapse of the conveyor belt. The system further includes a proppant chute positioned at an end of the conveyor assembly, the proppant chute having an opening to direct the proppant from the conveyor belt into a blending hopper, the proppant chute being positioned at a higher elevation than an inlet of the blending hopper such that the proppant exits the proppant chute into the blending hopper via gravity feed.

14 Claims, 4 Drawing Sheets

(56) References Cited

U.S. PATENT DOCUMENTS

| | | |
|---|---|---|
| 448,238 A | 3/1891 | Johnson |
| 711,632 A | 10/1902 | Johnson |
| 917,649 A | 4/1909 | Otto |
| 1,143,641 A | 6/1915 | McGregor |
| 1,331,883 A | 2/1920 | Stuart |
| 1,344,768 A | 6/1920 | Messiter |
| 1,434,488 A | 11/1922 | Forsythe et al. |
| 1,520,560 A | 12/1923 | Burno |
| 1,506,936 A | 9/1924 | Lea |
| 1,526,527 A | 2/1925 | Butler |
| 1,573,664 A | 2/1926 | Wetherill |
| 1,807,447 A | 5/1931 | Smith |
| 1,850,000 A | 3/1932 | Fernand |
| 1,932,320 A | 10/1933 | Steward |
| 1,973,312 A | 9/1934 | Hardinge |
| 2,233,005 A | 2/1941 | Garlinghouse |
| 2,293,160 A | 8/1942 | Miller et al. |
| 2,368,672 A | 2/1945 | McNamara |
| 2,381,103 A | 8/1945 | Frank |
| 2,423,879 A | 7/1947 | De Frees |
| 2,564,020 A | 8/1951 | Mengel |
| 2,603,342 A | 7/1952 | Martinson |
| 2,616,758 A | 11/1952 | Meyers |
| 2,622,771 A | 12/1952 | Tulou |
| 2,652,174 A | 9/1953 | Shea et al. |
| 2,678,145 A | 5/1954 | Ejuzwiak et al. |
| 2,693,282 A | 11/1954 | Sensibar |
| 2,700,574 A | 1/1955 | Tourneau |
| 2,792,262 A | 4/1955 | Hathorn |
| 2,774,515 A | 12/1956 | Johansson et al. |
| 2,791,973 A | 5/1957 | Dorey |
| 2,801,125 A | 7/1957 | Page et al. |
| 2,808,164 A | 10/1957 | Glendinning |
| 2,812,970 A | 11/1957 | Martinson |
| 2,837,369 A | 6/1958 | Stopps |
| 2,865,521 A | 12/1958 | Fisher et al. |
| 2,873,036 A | 2/1959 | Noble |
| 2,894,666 A | 7/1959 | Campbell, Jr. |
| 2,988,235 A | 6/1961 | Ronyak |
| 2,994,460 A | 8/1961 | Matthews |
| 3,049,248 A | 8/1962 | Heltzel et al. |
| 3,064,832 A | 11/1962 | Heltzel |
| 3,083,879 A | 4/1963 | Coleman |
| 3,090,527 A | 5/1963 | Rensch |
| 3,109,389 A | 11/1963 | Karlsson |
| 3,122,258 A | 2/1964 | Raymond |
| 3,135,432 A | 6/1964 | McKinney |
| 3,163,127 A | 12/1964 | Gutridge et al. |
| 3,187,684 A | 6/1965 | Ortner |
| 3,198,494 A | 8/1965 | Curran et al. |
| 3,199,585 A | 8/1965 | Cronberger |
| 3,248,026 A | 4/1966 | Kemp |
| 3,255,927 A | 6/1966 | Ruppert et al. |
| 3,265,443 A | 8/1966 | Simas |
| 3,270,921 A | 9/1966 | Nadolske et al. |
| 3,294,306 A | 12/1966 | Areddy |
| 3,318,473 A | 5/1967 | Jones et al. |
| 3,353,599 A | 11/1967 | Swift |
| 3,354,918 A | 11/1967 | Coleman |
| 3,378,152 A | 4/1968 | Warner |
| 3,387,570 A | 6/1968 | Pulcrano et al. |
| 3,396,675 A | 8/1968 | Stevens |
| 3,397,654 A | 8/1968 | Snyder |
| 3,406,995 A | 10/1968 | McCarthy |
| 3,407,971 A | 10/1968 | Oehler |
| 3,425,599 A | 2/1969 | Sammarco et al. |
| 3,455,474 A | 7/1969 | Truncali |
| 3,524,567 A | 8/1970 | Coleman |
| 3,528,570 A | 9/1970 | Pase |
| 3,561,633 A | 2/1971 | Morrison et al. |
| 3,587,834 A | 6/1971 | Dugge |
| 3,596,609 A | 8/1971 | Ortner |
| 3,601,244 A | 8/1971 | Ort et al. |
| 3,602,400 A | 8/1971 | Cooke |
| 3,650,567 A | 3/1972 | Danielson |
| 3,653,521 A | 4/1972 | Bridge |
| 3,661,293 A | 5/1972 | Gerhard et al. |
| 3,692,363 A | 9/1972 | Tenebaum et al. |
| 3,704,797 A | 12/1972 | Suykens |
| 3,721,199 A | 3/1973 | Hassenauer |
| 3,729,121 A | 4/1973 | Cannon |
| 3,734,215 A | 5/1973 | Smith |
| 3,738,511 A | 6/1973 | Lemon et al. |
| 3,777,909 A | 12/1973 | Rheinfrank |
| 3,785,534 A | 1/1974 | Smith |
| 3,800,712 A | 4/1974 | Krug, Jr. |
| 3,802,584 A * | 4/1974 | Sackett, Sr. ............ B65G 19/16 198/535 |
| 3,817,261 A | 6/1974 | Rogge |
| 3,820,762 A | 6/1974 | Bostrom et al. |
| 3,840,141 A | 10/1974 | Allom et al. |
| 3,854,612 A | 12/1974 | Snape |
| 3,861,716 A | 1/1975 | Baxter et al. |
| 3,883,005 A | 5/1975 | Stevens |
| 3,933,100 A | 1/1976 | Dugge |
| 3,970,123 A | 7/1976 | Poulton et al. |
| 3,986,708 A | 10/1976 | Heltzel et al. |
| 3,997,089 A | 12/1976 | Clarke et al. |
| 4,003,301 A | 1/1977 | Norton |
| 4,004,700 A | 1/1977 | Empey |
| 4,057,153 A | 11/1977 | Weaver |
| 4,058,239 A | 11/1977 | Van Mill |
| 4,063,656 A | 12/1977 | Lambert |
| 4,073,410 A | 2/1978 | Melcher |
| 4,138,163 A | 2/1979 | Calvert et al. |
| 4,178,117 A | 12/1979 | Brugler |
| 4,204,773 A | 5/1980 | Bates |
| 4,210,273 A | 7/1980 | Hegele |
| 4,210,963 A | 7/1980 | Ricciardi et al. |
| RE30,358 E | 8/1980 | Sensibar |
| 4,222,498 A | 9/1980 | Brock |
| 4,227,732 A | 10/1980 | Kish |
| 4,232,884 A | 11/1980 | DeWitt |
| 4,239,424 A | 12/1980 | Pavolka |
| 4,247,228 A | 1/1981 | Gray et al. |
| 4,258,953 A | 3/1981 | Johnson |
| 4,265,266 A | 5/1981 | Kierbow et al. |
| 4,278,190 A | 7/1981 | Oory et al. |
| 4,282,988 A | 8/1981 | Hulbert, Jr. |
| 4,287,921 A | 9/1981 | Sanford |
| 4,287,997 A | 9/1981 | Rolfe et al. |
| 4,289,353 A | 9/1981 | Merritt |
| 4,329,106 A | 5/1982 | Adler |
| 4,350,241 A | 9/1982 | Wenzel |
| 4,359,176 A | 11/1982 | Johnson |
| 4,363,396 A | 12/1982 | Wolf et al. |
| 4,397,406 A | 8/1983 | Croley |
| 4,398,653 A | 8/1983 | Daloisio |
| 4,402,392 A | 9/1983 | Fabian et al. |
| 4,407,202 A | 10/1983 | McCormick |
| 4,408,886 A | 10/1983 | Sampson et al. |
| 4,410,106 A | 10/1983 | Kierbow et al. |
| 4,427,133 A | 1/1984 | Kierbow et al. |
| 4,428,504 A | 1/1984 | Bassett et al. |
| 4,449,861 A | 5/1984 | Saito et al. |
| 4,453,645 A | 6/1984 | Usui et al. |
| 4,474,204 A | 10/1984 | West |
| 4,475,672 A | 10/1984 | Whitehead |
| 4,478,155 A | 10/1984 | Cena et al. |
| 4,483,462 A | 11/1984 | Heintz |
| 4,525,071 A | 6/1985 | Horowitz |
| 4,532,098 A | 7/1985 | Campbell |
| 4,569,394 A | 2/1986 | Sweatman et al. |
| 4,571,143 A | 2/1986 | Hellerich |
| 4,608,931 A | 9/1986 | Ruhmann et al. |
| 4,619,531 A | 10/1986 | Dunstan |
| 4,626,155 A | 12/1986 | Hlinsky et al. |
| 4,626,166 A | 12/1986 | Jolly |
| 4,628,825 A | 12/1986 | Taylor et al. |
| 4,660,733 A | 4/1987 | Snyder et al. |
| 4,701,095 A | 10/1987 | Berryman et al. |
| 4,715,754 A | 12/1987 | Scully |
| 4,738,774 A | 4/1988 | Patrick |
| 4,741,273 A | 5/1988 | Sherwood |

(56) References Cited

U.S. PATENT DOCUMENTS

| | | | |
|---|---|---|---|
| 4,801,389 A | 1/1989 | Brannon et al. | |
| 4,819,830 A | 4/1989 | Schultz | |
| 4,848,605 A | 7/1989 | Wise | |
| 4,882,784 A | 11/1989 | Tump | |
| 4,889,219 A | 12/1989 | Key | |
| 4,901,649 A | 2/1990 | Fehrenbach et al. | |
| 4,909,378 A | 3/1990 | Webb | |
| 4,909,556 A | 3/1990 | Koskinen | |
| 4,917,019 A | 4/1990 | Hesch et al. | |
| 4,919,583 A | 4/1990 | Speakman, Jr. | |
| 4,923,358 A * | 5/1990 | Van Mill | B60P 1/42 198/532 |
| 4,946,068 A | 8/1990 | Erickson et al. | |
| 4,947,760 A | 8/1990 | Dawson et al. | |
| 4,954,975 A | 9/1990 | Kalata | |
| 4,956,821 A | 9/1990 | Fenelon | |
| 4,975,205 A | 12/1990 | Sloan | |
| 4,995,522 A | 2/1991 | Barr | |
| 5,004,400 A | 4/1991 | Handke | |
| 5,042,538 A | 8/1991 | Wiese | |
| 5,069,352 A | 12/1991 | Harbolt et al. | |
| 5,080,259 A | 1/1992 | Hadley | |
| 5,082,304 A | 1/1992 | Preller | |
| 5,102,281 A | 4/1992 | Handke | |
| 5,102,286 A | 4/1992 | Fenton | |
| 5,105,858 A | 4/1992 | Levinson | |
| 5,131,524 A | 7/1992 | Uehara | |
| 5,190,182 A | 3/1993 | Copas et al. | |
| 5,195,861 A | 3/1993 | Handke | |
| 5,199,826 A | 4/1993 | Lawrence | |
| 5,201,546 A | 4/1993 | Lindsay | |
| 5,224,635 A | 7/1993 | Wise | |
| 5,253,746 A * | 10/1993 | Friesen | B65G 65/463 198/550.1 |
| 5,253,776 A | 10/1993 | Decroix et al. | |
| 5,265,763 A | 11/1993 | Heinrici et al. | |
| 5,286,158 A | 2/1994 | Zimmerman | |
| 5,290,139 A | 3/1994 | Hedrick | |
| 5,320,046 A | 6/1994 | Hesch | |
| 5,324,097 A | 6/1994 | DeCap | |
| 5,339,996 A | 8/1994 | Dubbert | |
| 5,358,137 A | 10/1994 | Shuert et al. | |
| 5,373,792 A | 12/1994 | Pileggi et al. | |
| 5,402,915 A | 4/1995 | Hogan | |
| 5,413,154 A | 5/1995 | Hurst et al. | |
| 5,429,259 A | 7/1995 | Robin | |
| 5,441,321 A | 8/1995 | Karpisek | |
| 5,445,289 A | 8/1995 | Owen | |
| 5,465,829 A * | 11/1995 | Kruse | B65D 77/061 198/538 |
| 5,470,175 A | 11/1995 | Jensen et al. | |
| 5,493,852 A | 2/1996 | Stewart | |
| 5,538,286 A | 7/1996 | Hoff | |
| 5,549,278 A | 8/1996 | Sidler | |
| 3,281,006 A | 10/1996 | Tohchung | |
| 5,564,599 A | 10/1996 | Barber et al. | |
| 5,570,743 A | 11/1996 | Padgett et al. | |
| 5,590,976 A | 1/1997 | Kilheffer et al. | |
| 5,601,181 A * | 2/1997 | Lindhorst | B65G 11/083 193/25 E |
| 5,602,761 A | 2/1997 | Spoerre et al. | |
| 5,613,446 A | 3/1997 | DiLuigi et al. | |
| 5,617,974 A | 4/1997 | Sawyer | |
| 5,647,514 A | 7/1997 | Toth et al. | |
| RE35,580 E | 8/1997 | Heider et al. | |
| 5,667,298 A | 9/1997 | Musil | |
| 5,687,881 A | 11/1997 | Rouse et al. | |
| 5,690,466 A | 11/1997 | Gaddis et al. | |
| 5,697,535 A | 12/1997 | Coleman | |
| 5,706,614 A | 1/1998 | Wiley et al. | |
| 5,718,555 A | 2/1998 | Swalheim | |
| 5,722,552 A | 3/1998 | Olson | |
| 5,761,854 A | 6/1998 | Johnson et al. | |
| 5,762,222 A | 6/1998 | Liu | |
| 5,772,390 A | 6/1998 | Walker | |
| 5,782,524 A | 7/1998 | Heider et al. | |
| 5,785,421 A | 7/1998 | Milek | |
| 5,803,296 A | 9/1998 | Olson | |
| 5,806,863 A | 9/1998 | Heger et al. | |
| 5,836,480 A | 11/1998 | Epp et al. | |
| 5,845,799 A | 12/1998 | Deaton | |
| 5,876,172 A | 3/1999 | Di Rosa | |
| 5,906,471 A * | 5/1999 | Schwoerer | B65G 33/32 222/413 |
| 5,911,337 A | 6/1999 | Bedeker | |
| 5,927,558 A | 7/1999 | Bruce | |
| 5,971,219 A | 10/1999 | Karpisek | |
| 6,002,063 A | 12/1999 | Bilak et al. | |
| 6,006,918 A | 12/1999 | Hart | |
| 6,069,118 A | 5/2000 | Hinkel et al. | |
| 6,077,068 A | 6/2000 | Okumura | |
| 6,092,974 A | 7/2000 | Roth | |
| 6,109,486 A | 8/2000 | Lee | |
| 6,120,233 A | 9/2000 | Adam | |
| 6,155,175 A | 12/2000 | Rude et al. | |
| 6,186,654 B1 | 2/2001 | Gunteret et al. | |
| 6,190,107 B1 | 2/2001 | Lanigan et al. | |
| 6,192,985 B1 | 2/2001 | Hinkel et al. | |
| 6,196,590 B1 | 3/2001 | Kim | |
| 6,205,938 B1 | 3/2001 | Foley et al. | |
| 6,247,594 B1 | 6/2001 | Garton | |
| 6,263,803 B1 | 7/2001 | Dohr et al. | |
| 6,269,849 B1 | 8/2001 | Fields | |
| 6,283,212 B1 | 9/2001 | Hinkel et al. | |
| 6,286,986 B2 | 9/2001 | Grimland | |
| 6,296,109 B1 * | 10/2001 | Nohl | B65G 21/14 198/632 |
| 6,306,800 B1 | 10/2001 | Samuel et al. | |
| 6,328,156 B1 | 12/2001 | Ostman | |
| 6,328,183 B1 | 12/2001 | Coleman | |
| 6,364,584 B1 | 4/2002 | Taylor | |
| 6,374,915 B1 | 4/2002 | Andrews | |
| 6,382,446 B1 | 5/2002 | Hinkle et al. | |
| 6,401,983 B1 | 6/2002 | McDonald et al. | |
| 6,412,422 B2 | 7/2002 | Dohr et al. | |
| 6,415,909 B1 | 7/2002 | Mitchell et al. | |
| 6,416,271 B1 | 7/2002 | Pigott et al. | |
| 6,425,725 B1 * | 7/2002 | Ehlers | B60P 1/42 414/505 |
| 6,457,291 B2 | 10/2002 | Wick | |
| 6,505,760 B1 | 1/2003 | Werner | |
| 6,508,387 B1 | 1/2003 | Simon et al. | |
| 6,508,615 B2 | 1/2003 | Taylor | |
| 6,523,482 B2 | 2/2003 | Wingate | |
| 6,537,002 B2 | 3/2003 | Gloystein | |
| 6,575,614 B2 | 6/2003 | Tosco et al. | |
| 6,660,693 B2 | 12/2003 | Miller et al. | |
| 6,666,573 B2 | 12/2003 | Grassi | |
| 6,675,073 B2 | 1/2004 | Kieman et al. | |
| 6,705,449 B2 * | 3/2004 | Wagstaffe | B07B 1/005 198/313 |
| 6,720,290 B2 | 4/2004 | England et al. | |
| 6,772,912 B1 | 8/2004 | Schall et al. | |
| 6,774,318 B2 | 8/2004 | Beal et al. | |
| 6,776,235 B1 | 8/2004 | England | |
| 6,783,032 B2 | 8/2004 | Fons | |
| 6,811,048 B2 | 11/2004 | Lau | |
| 6,828,280 B2 | 12/2004 | England et al. | |
| 6,835,041 B1 | 12/2004 | Albert | |
| 6,882,960 B2 | 4/2005 | Miller | |
| 6,902,061 B1 | 6/2005 | Elstone | |
| 6,915,854 B2 | 7/2005 | England et al. | |
| 6,953,119 B1 | 10/2005 | Wening | |
| 6,955,127 B2 | 10/2005 | Taylor | |
| 6,964,551 B1 * | 11/2005 | Friesen | B60P 1/40 410/77 |
| 6,968,946 B2 | 11/2005 | Shuert | |
| 6,974,021 B1 * | 12/2005 | Boevers | A01D 41/1217 198/550.2 |
| 7,008,163 B2 | 3/2006 | Russell | |
| 7,051,661 B2 | 5/2006 | Herzog et al. | |
| 7,084,095 B2 | 8/2006 | Lee et al. | |
| 7,104,425 B2 | 9/2006 | Le Roy | |
| 7,140,516 B2 | 11/2006 | Bothor | |

(56) References Cited

U.S. PATENT DOCUMENTS

| | | | |
|---|---|---|---|
| 7,146,914 B2 | 12/2006 | Morton et al. |
| 7,201,290 B2 | 4/2007 | Mehus et al. |
| 7,214,028 B2 | 5/2007 | Boasso |
| 7,240,681 B2 | 7/2007 | Saik |
| 7,252,309 B2 | 8/2007 | Eng Soon et al. |
| 7,284,579 B2 | 10/2007 | Elgan et al. |
| 7,316,333 B2 | 1/2008 | Wegner |
| 7,367,271 B2 | 5/2008 | Early |
| 7,377,219 B2 | 5/2008 | Brandt |
| 7,410,623 B2 | 8/2008 | Mehus et al. |
| 7,475,796 B2 | 1/2009 | Garton |
| 7,500,817 B2 | 3/2009 | Furrer et al. |
| 7,513,280 B2 | 4/2009 | Brashears et al. |
| 7,591,386 B2 | 9/2009 | Hooper |
| 7,640,075 B2 | 12/2009 | Wietgrefe |
| 7,753,637 B2 | 7/2010 | Benedict et al. |
| 7,798,558 B2 | 9/2010 | Messier |
| 7,802,958 B2 | 9/2010 | Garcia et al. |
| 7,803,321 B2 | 9/2010 | Lark et al. |
| 7,837,427 B2 | 11/2010 | Beckel |
| 7,841,394 B2 | 11/2010 | McNeel et al. |
| 7,845,516 B2 | 12/2010 | Pessin et al. |
| 7,858,888 B2 | 12/2010 | Lucas et al. |
| 7,891,304 B2 | 2/2011 | Herzog et al. |
| 7,891,523 B2 | 2/2011 | Mehus et al. |
| 7,896,198 B2 | 3/2011 | Mehus et al. |
| 7,921,783 B2 | 4/2011 | Forbes et al. |
| 7,967,161 B2 | 6/2011 | Townsend |
| 7,980,803 B2 | 7/2011 | Brandstätter et al. |
| 7,997,623 B2 | 8/2011 | Williams |
| 8,083,083 B1 | 12/2011 | Mohns |
| 8,201,520 B2 | 6/2012 | Meritt |
| 8,313,278 B2 | 11/2012 | Simmons et al. |
| 8,366,349 B2 | 2/2013 | Beachner |
| 8,379,927 B2 | 2/2013 | Taylor |
| 8,387,824 B2 | 3/2013 | Wietgrefe |
| 8,393,502 B2 | 3/2013 | Renyer et al. |
| 8,424,666 B2 * | 4/2013 | Berning | E01C 23/088 198/313 |
| D688,351 S | 8/2013 | Oren |
| 8,505,780 B2 | 8/2013 | Oren |
| 8,545,148 B2 | 10/2013 | Wanek-Pusset et al. |
| 8,562,022 B2 | 10/2013 | Nadeau et al. |
| 8,573,387 B2 * | 11/2013 | Trimble | B65G 41/002 198/313 |
| 8,573,917 B2 | 11/2013 | Renyer |
| 8,585,341 B1 | 11/2013 | Oren |
| D694,670 S | 12/2013 | Oren |
| 8,616,370 B2 | 12/2013 | Allegretti |
| 8,622,251 B2 | 1/2014 | Oren |
| 8,636,832 B2 | 1/2014 | Stutzman et al. |
| 8,646,641 B2 | 2/2014 | Moir |
| 8,668,430 B2 | 3/2014 | Oren |
| D703,582 S | 4/2014 | Oren |
| 8,820,559 B2 | 9/2014 | Beitler et al. |
| 8,827,118 B2 | 9/2014 | Oren |
| 8,887,914 B2 | 11/2014 | Allegretti |
| 8,905,266 B2 | 12/2014 | De Brabanter |
| 8,915,691 B2 | 12/2014 | Mintz |
| 9,051,801 B1 | 6/2015 | Mintz |
| 9,052,034 B1 | 6/2015 | Wegner et al. |
| 9,340,353 B2 * | 5/2016 | Oren |
| 9,440,785 B2 * | 9/2016 | Oren | B65G 65/42 |
| 2001/0022308 A1 | 9/2001 | Epp et al. |
| 2001/0045338 A1 | 11/2001 | Ransil et al. |
| 2002/0134550 A1 | 9/2002 | Leeson et al. |
| 2002/0139643 A1 | 10/2002 | Peltier et al. |
| 2003/0111470 A1 | 6/2003 | Fouillet et al. |
| 2003/0156929 A1 | 8/2003 | Russell |
| 2004/0065699 A1 | 4/2004 | Schoer et al. |
| 2004/0074922 A1 | 4/2004 | Bother et al. |
| 2004/0084874 A1 | 5/2004 | McDougall et al. |
| 2004/0206646 A1 | 10/2004 | Goh |
| 2004/0245284 A1 | 12/2004 | Mehus et al. |
| 2005/0158158 A1 | 7/2005 | Porta |
| 2005/0201851 A1 | 9/2005 | Jonkka |
| 2006/0012183 A1 | 1/2006 | Marchiori et al. |
| 2006/0027582 A1 | 2/2006 | Beach |
| 2006/0151058 A1 | 7/2006 | Salaoras et al. |
| 2006/0180062 A1 | 8/2006 | Furrer et al. |
| 2006/0180232 A1 | 8/2006 | Glewwe et al. |
| 2006/0239806 A1 | 10/2006 | Yelton |
| 2006/0267377 A1 | 11/2006 | Lusk et al. |
| 2006/0277783 A1 | 12/2006 | Garton |
| 2006/0289166 A1 | 12/2006 | Stromquist et al. |
| 2007/0096537 A1 | 5/2007 | Hicks |
| 2007/0125543 A1 | 6/2007 | McNeel et al. |
| 2008/0008562 A1 | 1/2008 | Beckel et al. |
| 2008/0029546 A1 | 2/2008 | Schuld |
| 2008/0029553 A1 | 2/2008 | Culleton |
| 2008/0179054 A1 | 7/2008 | McGough et al. |
| 2008/0179324 A1 | 7/2008 | McGough et al. |
| 2008/0213073 A1 | 9/2008 | Benedict et al. |
| 2008/0226434 A1 | 9/2008 | Smith et al. |
| 2008/0264641 A1 | 10/2008 | Slabaugh et al. |
| 2008/0277423 A1 | 11/2008 | Garton |
| 2009/0038242 A1 | 2/2009 | Cope |
| 2009/0078410 A1 | 3/2009 | Krenek et al. |
| 2009/0278326 A1 | 11/2009 | Rowland et al. |
| 2010/0021258 A1 | 1/2010 | Kim |
| 2010/0038143 A1 | 2/2010 | Burnett et al. |
| 2010/0040446 A1 | 2/2010 | Renyer |
| 2010/0065466 A1 | 3/2010 | Perkins |
| 2010/0108711 A1 | 5/2010 | Wietgrefe |
| 2010/0278621 A1 | 11/2010 | Redekop |
| 2010/0288603 A1 | 11/2010 | Schafer |
| 2011/0011893 A1 | 1/2011 | Cerny |
| 2011/0017693 A1 | 1/2011 | Thomas |
| 2011/0101040 A1 | 5/2011 | Weissbrod |
| 2011/0109073 A1 | 5/2011 | Williams |
| 2011/0127178 A1 | 6/2011 | Claussen |
| 2011/0160104 A1 | 6/2011 | Wu et al. |
| 2011/0162838 A1 | 7/2011 | Mackenzie et al. |
| 2011/0168593 A1 | 7/2011 | Neufeld et al. |
| 2011/0222983 A1 | 9/2011 | Dugic et al. |
| 2011/0297702 A1 | 12/2011 | Hildebrandt et al. |
| 2012/0103848 A1 | 5/2012 | Allegretti et al. |
| 2012/0219391 A1 | 8/2012 | Teichrob et al. |
| 2013/0004272 A1 | 1/2013 | Mintz |
| 2013/0022441 A1 | 1/2013 | Uhryn et al. |
| 2013/0206415 A1 | 8/2013 | Sheesley |
| 2013/0209204 A1 | 8/2013 | Sheesley |
| 2013/0233545 A1 | 9/2013 | Mahoney |
| 2013/0284729 A1 | 10/2013 | Cook et al. |
| 2013/0309052 A1 | 11/2013 | Luharuka |
| 2013/0323005 A1 | 12/2013 | Rexius et al. |
| 2014/0020765 A1 | 1/2014 | Oren |
| 2014/0020892 A1 | 1/2014 | Oren |
| 2014/0023465 A1 | 1/2014 | Oren et al. |
| 2014/0044507 A1 | 2/2014 | Naizer et al. |
| 2014/0083554 A1 | 3/2014 | Harris |
| 2014/0097182 A1 | 4/2014 | Sheesley |
| 2014/0166647 A1 | 6/2014 | Sheesley |
| 2014/0203046 A1 | 7/2014 | Allegretti |
| 2014/0234059 A1 | 8/2014 | Thomeer |
| 2014/0305769 A1 | 10/2014 | Eiden et al. |
| 2014/0321950 A1 | 10/2014 | Krenek et al. |
| 2015/0069052 A1 | 3/2015 | Allegretti et al. |
| 2015/0086307 A1 | 3/2015 | Stefan |

FOREIGN PATENT DOCUMENTS

| | | |
|---|---|---|
| CN | 201881469 | 10/2000 |
| CN | 201390486 | 1/2010 |
| CN | 103350017 | 10/2013 |
| DE | 3108121 | 9/1982 |
| DE | 3342281 | 6/1985 |
| DE | 4217329 | 5/1993 |
| EP | 0019967 | 12/1980 |
| EP | 322283 | 6/1989 |
| EP | 0564969 | 10/1993 |
| EP | 0997607 | 5/2000 |
| EP | 1052194 | 11/2000 |
| EP | 1167236 | 1/2002 |

(56) References Cited

FOREIGN PATENT DOCUMENTS

| | | |
|---|---|---|
| EP | 1775190 | 4/2007 |
| EP | 2062832 | 5/2009 |
| EP | 2311757 | 4/2011 |
| FR | 2640598 | 6/1990 |
| GB | 1296736 | 11/1972 |
| GB | 2374864 | 10/2002 |
| JP | S4871029 | 9/1973 |
| JP | S4876041 | 9/1973 |
| JP | S58161888 | 10/1983 |
| JP | 410087046 | 4/1998 |
| JP | 10264882 | 10/1998 |
| MX | 2012011046 | 5/2013 |
| WO | 9008082 | 7/1990 |
| WO | 9202437 | 2/1992 |
| WO | 9301997 | 2/1993 |
| WO | 9306031 | 4/1993 |
| WO | 2006039757 | 4/2006 |
| WO | 2007005054 | 1/2007 |
| WO | 2007061310 | 5/2007 |
| WO | 2010026235 | 3/2010 |
| WO | 2011099358 | 8/2011 |
| WO | 2012021447 | 2/2012 |
| WO | 2012058059 | 5/2012 |

OTHER PUBLICATIONS

SandBox Logistics, LLC, screenshots from video dated Sep. 19, 2013.
SandBox Logistics, LLC, screenshots from video dated Aug. 22, 2014.
SandBox Logistics, LLC, screenshots from video dated Oct. 11, 2013.
SandBox Logistics, LLC, screenshots from video dated Apr. 10, 2013.
Grit Energy Solutions, LLC, Fidelity, Screenshots from video dated May 16, 2014.
Grit Energy Solutions, LLC, Gate, Screenshots from video dated Dec. 6, 2013, https://www.youtube.com/user/gritstack.
Grit Energy Solutions, LLC, Screen, Screenshots from video dated Dec. 6, 2013, https://www.youtube.com/user/gritstack.
Grit Energy Solutions, LLC, The Grit Stack System—Live Frac, Screenshots from video dated Jun. 15, 2015, https://www.youtube.com/user/gritstack.
Grit Energy Solutions, LLC, The Grit Stack System, Screenshots from video dated Feb. 7, 2014, https://www.youtube.com/user/gritstack.
Non-Final Office Action Mailed May 13, 2016 for co-pending U.S. Appl. No. 14/986,826.
Final Office Action Mailed Sep. 15, 2016 for co-pending U.S. Appl. No. 14/922,836.
Non-Final Office Action Mailed Feb. 4, 2016 for co-pending U.S. Appl. No. 14/922,836.
Final Office Action Mailed Aug. 25, 2016 for co-pending U.S. Appl. No. 14/927,614.
Non-Final Office Action Mailed Mar. 1, 2016 for co-pending U.S. Appl. No. 14/927,614.
Non-Final Office Action Mailed Apr. 29, 2016 for co-pending U.S. Appl. No. 14/943,182.
Final Office Action Mailed Sep. 15, 2016 for co-pending U.S. Appl. No. 14/882,973.
Non-Final Office Action Mailed Feb. 11, 2016 for co-pending U.S. Appl. No. 14/882,973.
Non-Final Office Action Mailed Aug. 11, 2016 for co-pending U.S. Appl. No. 13/625,675.
Final Office Action Mailed Nov. 11, 2015 for co-pending U.S. Appl. No. 13/625,675.
Non-Final Office Action Mailed Mar. 11, 2015 for co-pending U.S. Appl. No. 13/625,675.
International Search Report for related International Application No. PCT/US2012/066639, Feb. 25, 2013.
International Search Report for related International Application No. PCT/US2013/035442, Jun. 23, 2013.
International Search Report for related International Application No. PCT/US2013/032819, May 23, 2013.
International Search Report for related International Application No. PCT/US2013/049028, Mar. 4, 2014.
International Preliminary Report on Patentability for PCT/US2012/066639, Feb. 26, 2013.
International Preliminary Report on Patentability for PCT/US2013/032819, Sep. 23, 2014.
International Search Report for PCT/US2015/012990, dated May 6, 2015. (15 pages).
FS-35 Desert Frac-Sanders. NOV (National Oilwell Varco). Mar. 19, 2012. (https://web.archive.org/web/20120319070423/http://www.nov.com/Well_Service_and_Completion/Frac_Sand_Handling_Equipment/Frac_Sanders/FS-35.aspx).
File History for U.S. Appl. No. 61/538,616, Robert A. Harris, filed Sep. 23, 2011. (21 pages).
International Search Report for PCT/US2015/024810, Jul. 8, 2015. (13 pages).
European Search Report for Application No. 15167039.5, Sep. 8, 2015. (7 pages).
SandBox Logistics, "Mine to Wellhead Logistics," Houston, TX, May 2013.
SandBox Logistics, screenshots from video made in Apr., 2013 and publicly shown in May 2013, Arnegard, North Dakota.
PCT International Search Report for PCT/US15/49074, Dec. 17, 2015. (11 pages).
International Search Report for PCT/US15/35635, Oct. 30, 2015. (12 pages).
Frac Sand Primer by Brian D. Olmen, Kelrick, LLC, from Hydraulic Fracturing by Michael Berry Smith and Carl Montgomery (CRC Press, Dec. 16, 2015), p. 384.
Premier Silica LLC, Sands Application in the Energy Market, Irving, TX, Copyright 2016.
Getty, John, Montana Tech; ASTM International, Overview of Proppants and Existing Standards and Practices, Jacksonville, FL, Jan. 29, 2013.
Arrows Up, Inc., Jumbo BTS—Bulk Transport System, Aug. 1, 2014.
Arrows Up, Inc., Reusable Packaging Association, Member Spotlight: John Allegretti, President & CEO, Arrows Up, Inc., Jun. 23, 2016.
Seed Today, Arrows Up, Inc. Bulk Transport System (BTS), Country Journal Publishing Co., Decatur, IL, Mar. 2, 2011.
SeedQuest, Arrows Up, Inc. launches innovative bulk transport system for see, Barrington, IL, Mar. 2, 2011.
Monster Tanks, Inc., Sand Monster Website, http://monstertanksinc.com/sandmonster.html, 2012.
Solaris Oilfield Infrastructure, Mobile Sand Silo System, 2016.
Final Office Action Mailed Sep. 27, 2016 for co-pending U.S. Appl. No. 13/555,635.
Non-Final Office Action Mailed Mar. 23, 2016 for co-pending U.S. Appl. No. 13/555,635.
Final Office Action Mailed Jul. 30, 2015 for co-pending U.S. Appl. No. 13/555,635.
Non-Final Office Action Mailed Oct. 22, 2014 for co-pending U.S. Appl. No. 131555,635.
Final Office Action Mailed Jun. 21, 2016 for co-pending U.S. Appl. No. 13/628,702.
Non-Final Office Action Mailed Feb. 23, 2016 for co-pending U.S. Appl. No. 13/628,702.
Final Office Action Mailed Sep. 22, 2015 for co-pending U.S. Appl. No. 13/628,702.
Non-Final Office Action Mailed Jul. 28, 2015 for co-pending U.S. Appl. No. 13/628,702.
Final Office Action Mailed Mar. 24, 2015 for co-pending U.S. Appl. No. 13/628,702.
Non-Final Office Action Mailed Sep. 18, 2014 for co-pending U.S. Appl. No. 13/628,702.
Final Office Action Mailed Jun. 27, 2016 for co-pending U.S. Appl. No. 14/831,924.

(56) References Cited

OTHER PUBLICATIONS

Non-Final Office Action Mailed Feb. 16, 2016 for co-pending U.S. Appl. No. 14/831,924.
Final Office Action Mailed Jun. 27, 2016 for co-pending U.S. Appl. No. 14/923,920.
Non-Final Office Action Mailed Feb. 9, 2016 for co-pending U.S. Appl. No. 14/923,920.
Final Office Action Mailed Sep. 15, 2016 for co-pending U.S. Appl. No. 14/943,111.
Non-Final Office Action Mailed Apr. 5, 2016 for co-pending U.S. Appl. No. 14/943,111.
Final Office Action Mailed Jul. 18, 2016 for co-pending U.S. Appl. No. 14/948,494.
Non-Final Office Action Mailed Apr. 8, 2016 for co-pending U.S. Appl. No. 14/948,494.
Non-Final Office Action Mailed Sep. 6, 2016 for co-pending U.S. Appl. No. 15/144,296.
Non-Final Office Action Mailed Jul. 25, 2016 for co-pending U.S. Appl. No. 13/660,855.
Final Office Action Mailed Apr. 28, 2016 for co-pending U.S. Appl. No. 13/660,855.
Non-Final Office Action Mailed Oct. 6, 2015 for co-pending U.S. Appl. No. 13/660,855.
Final Office Action Mailed Aug. 6, 2015 for co-pending U.S. Appl. No. 13/660,855.
Non-Final Office Action Mailed Apr. 29, 2015 for co-pending U.S. Appl. No. 13/660,855.
Final Office Action Mailed Dec. 17, 2014 for co-pending U.S. Appl. No. 13/660,855.
Non-Final Office Action Mailed Sep. 4, 2014 for co-pending U.S. Appl. No. 13/660,855.
Final Office Action Mailed Sep. 24, 2013 for co-pending U.S. Appl. No. 13/660,855.
Non-Final Office Action Mailed May 14, 2013 for co-pending U.S. Appl. No. 13/660,855.
Non-Final Office Action Mailed Jul. 5, 2016 for co-pending U.S. Appl. No. 14/996,362.
Non-Final Office Action Mailed Jul. 6, 2016 for co-pending U.S. Appl. No. 15/144,450.
Final Office Action Mailed Sep. 29, 2016 for co-pending U.S. Appl. No. 13/768,962.
Non-Final Office Action Mailed Apr. 5, 2016 for co-pending U.S. Appl. No. 13/768,962.
Final Office Action Mailed Oct. 9, 2015 for co-pending U.S. Appl. No. 13/768,962.
Non-Final Office Action Mailed May 1, 2015 for co-pending U.S. Appl. No. 13/768,962.
Non-Final Office Action Mailed Jul. 18, 2016 for co-pending U.S. Appl. No. 15/152,744.
Non-Final Office Action Mailed Apr. 13, 2016 for co-pending U.S. Appl. No. 14/738,485.
Non-Final Office Action Mailed Sep. 7, 2016 for co-pending U.S. Appl. No. 14/841,942.
Final Office Action Mailed May 12, 2016 for co-pending U.S. Appl. No. 14/841,942.
Non-Final Office Action Mailed Nov. 30, 2015 for co-pending U.S. Appl. No. 14/841,942.
Non-Final Office Action Mailed Jul. 21, 2016 for co-pending U.S. Appl. No. 15/083,596.
Non-Final Office Action Mailed Aug. 19, 2016 for co-pending U.S. Appl. No. 15/084,613.
Non-Final Office Action Mailed Sep. 6, 2016 for co-pending U.S. Appl. No. 15/143,942.
Final Office Action Mailed Sep. 1, 2016 for co-pending U.S. Appl. No. 14/848,447.
Non-Final Office Action Mailed Apr. 8, 2016 for co-pending U.S. Appl. No. 14/848,447.
PCT International Search Report for PCT/US15/57601, May 6, 2016. (11 pages).
Non-Final Office Action Mailed Apr. 3, 2017 for co-pending U.S. Appl. No. 13/555,635.
Non-Final Office Action Mailed Feb. 14, 2017 for co-pending U.S. Appl. No. 14/943,111.
Final Office Action Mailed Mar. 7, 2017 for co-pending U.S. Appl. No. 15/144,296.
Non-Final Office Action Mailed Apr. 6, 2017 for co-pending U.S. Appl. No. 13/768,962.
Non-Final Office Action Mailed Mar. 6, 2017 for co-pending U.S. Appl. No. 15/152,744.
Non-Final Office Action Mailed Feb. 24, 2017 for co-pending U.S. Appl. No. 14/943,182.
Non-Final Office Action Mailed Dec. 28, 2016 for co-pending U.S. Appl. No. 13/628,702.
Non-Final Office Action Mailed Jan. 13, 2017 for co-pending U.S. Appl. No. 14/923,920.
Final Office Action Mailed Jan. 12, 2017 for co-pending U.S. Appl. No. 14/841,942.
Non-Final Office Action Mailed Dec. 23, 2016 for co-pending U.S. Appl. No. 14/485,686.
Non-Final Office Action Mailed Jan. 27, 2017 for co-pending U.S. Appl. No. 14/485,687.
Non-Final Office Action Mailed Dec. 20, 2016 for co-pending U.S. Appl. No. 14/831,924.
Final Office Action Mailed Jan. 19, 2017 for co-pending U.S. Appl. No. 13/660,855.
Final Office Action Mailed Nov. 25, 2016 for co-pending U.S. Appl. No. 15/152,744.
Non-Final Office Action Mailed Dec. 15, 2016 for co-pending U.S. Appl. No. 14/848,447.
Non-Final Office Action Mailed Dec. 9, 2016 for co-pending U.S. Appl. No. 14/927,614.
International Search Report for PCT Application No. PCT/US2016/050859 mailed Dec. 9, 2016.
Non-Final Office Action Mailed Oct. 27, 2016 for co-pending U.S. Appl. No. 15/219,676.
Non-Final Office Action Mailed Nov. 9, 2016 for co-pending U.S. Appl. No. 14/948,494.
Final Office Action Mailed Nov. 4, 2016 for co-pending U.S. Appl. No. 14/738,485.

\* cited by examiner

SYSTEM AND METHOD FOR DELIVERING PROPPANT TO A BLENDER

RELATED APPLICATIONS

This application is related to and claims priority to, and the benefit of, U.S. Provisional Application No. 62/050,752, filed Sep. 15, 2014, titled "System and Method for Delivering Proppant To A Blender," and U.S. Provisional Application No. 62/217,117, filed Sep. 11, 2015, titled "System and Method for Delivering Proppant To A Blender," each of which are incorporated herein by reference in their entireties.

BACKGROUND

Summary

In an embodiment, a system for conveying proppant includes a conveyor system having a conveyor belt, the conveyor belt receiving proppant from one or more containers having proppant stored therein distributed along the conveyor system and carrying the proppant away from the conveyors. The system also includes a conveyor assembly having one or more joints to enable expansion and collapse of the conveyor belt. The system further includes a proppant chute positioned at an end of the conveyor assembly, the proppant chute having an opening to direct the proppant from the conveyor belt into a blending hopper, the proppant chute being positioned at a higher elevation than an inlet of the blending hopper such that the proppant exits the proppant chute into the blending hopper via gravity feed.

In another embodiment, a system to convey proppant includes a conveyor stem to receive and support one or more containers having proppant stored therein. The system also includes a conveyor belt positioned beneath the one or more containers to receive the proppant dispensed from the one or more containers and to transport the proppant away from the one or more containers. Moreover, the system includes a conveyor assembly positioned at an end of the conveyor system, the conveyor assembly baying an inclined section that increases a vertical position of the conveyor belt relative to a ground plane, one or more joints positioned along the conveyor assembly to enable expansion and compaction of the conveyor belt and a proppant chute positioned at the end of the conveyor assembly, the proppant chute moveable to direct the proppant away from the convey belt. Additionally, the system includes a blending hopper positioned proximate the conveyor system to receive and mix the proppant with one or more proppant fluids for injection into a well. The system also includes a tub positioned at an inlet of the blending hopper between the blending hopper and the proppant chute, the tub being removable from the blending hopper and positioned at a lower elevation than the proppant chute when coupled to the blending hopper.

In a further embodiment, a method includes dispensing proppant from a container positioned on a conveyor system onto a conveyor belt. The method also includes transporting the proppant, via the conveyor belt, away from the container and toward a conveyor assembly. The method further includes transferring the proppant to a proppant chute such that the elevation of the proppant on the conveyor belt is increased. The method also includes directing the proppant into a blending hopper via gravity feed.

DETAILED DESCRIPTION

Figure 1:
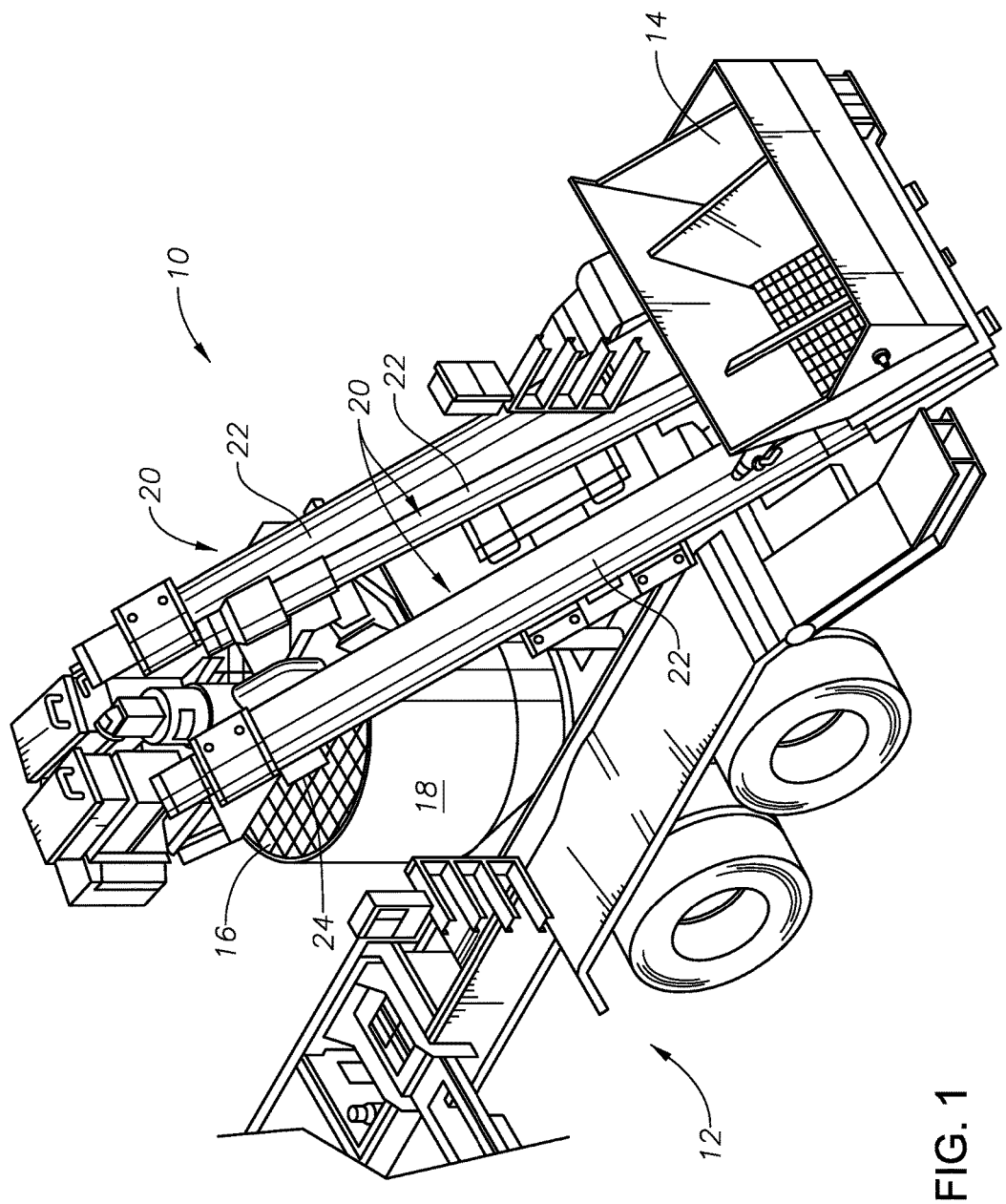
FIG. 1 is a perspective view of a blender unit.
Figure 2:
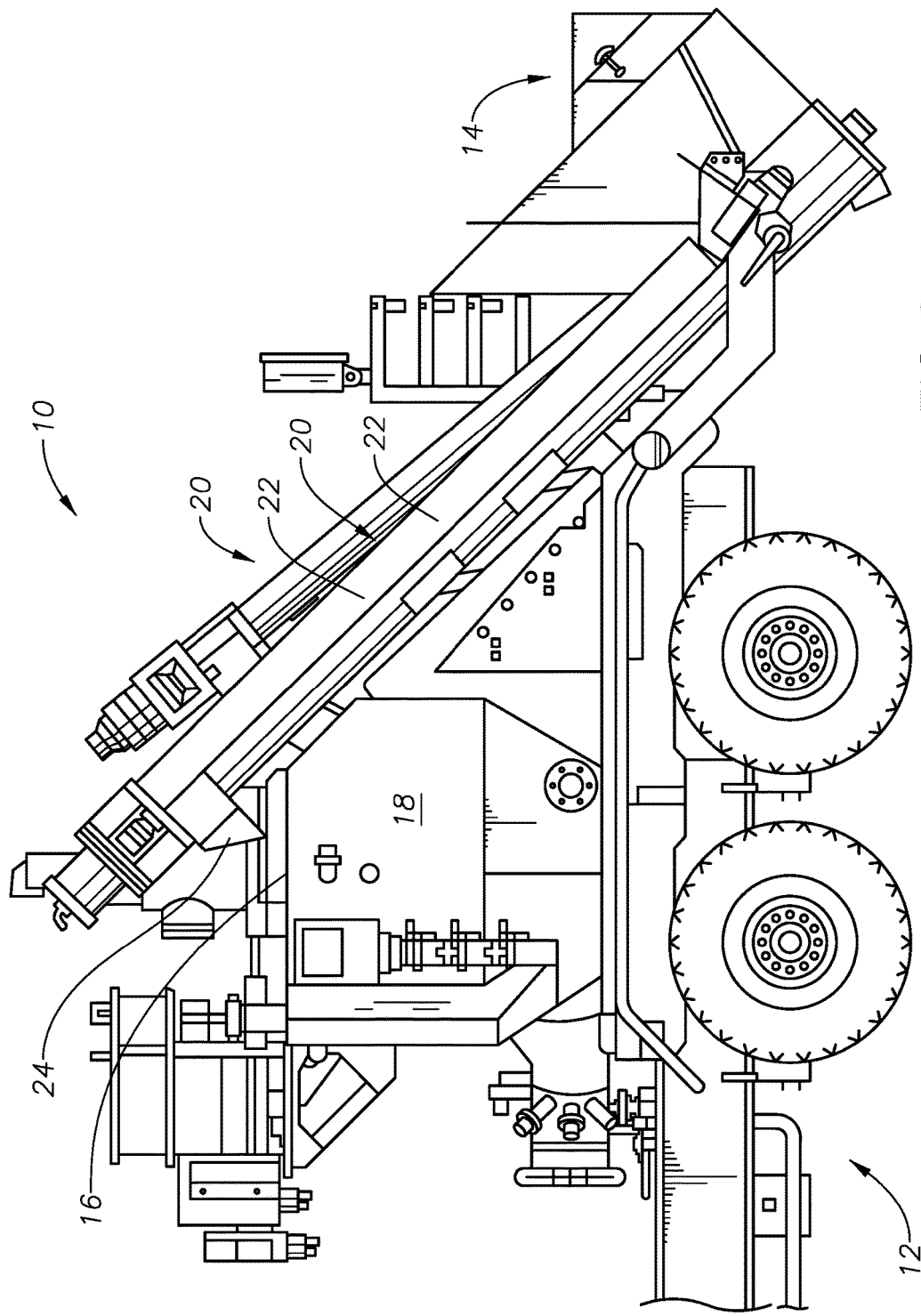
FIG. 2 is a side view of the blender unit of FIG. 1.
Figure 3:
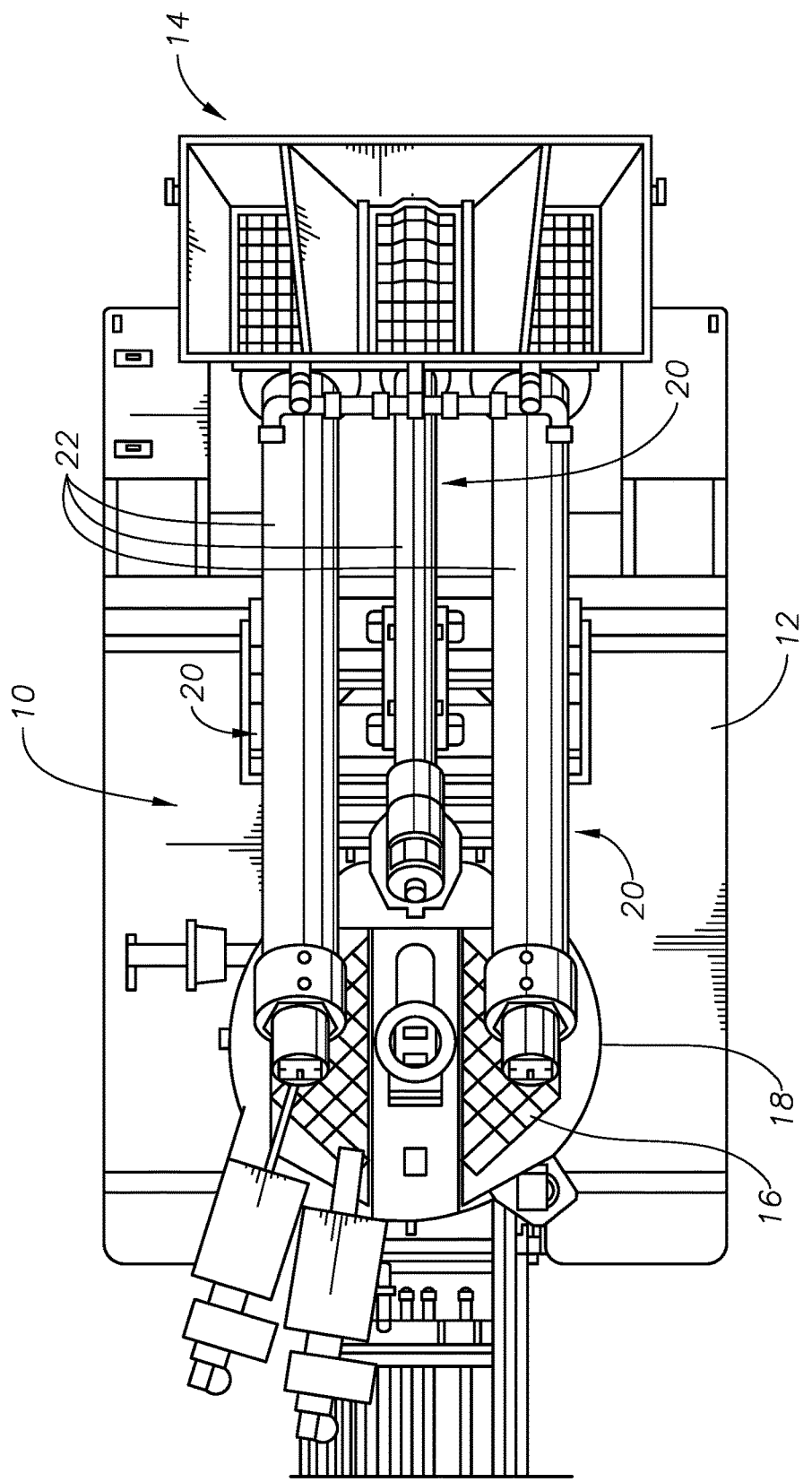
FIG. 3 is a top view of the blender unit of FIGS. 1 and 2.

FIGS. 1-3 illustrate a proppant blender unit 10 mounted on a trailer 12 for ease of transport. The purpose of the blender unit 10 is to mix proppant at a well site prior to introduction of the proppant Into a well during a hydraulic fracturing operation. Typically, the blender unit 10 has a tub 14 for receiving proppant from a conveyor (not shown). Once deposited in the tub 14, the proppant must be lifted to the inlet 16 of a blending hopper 18. This may be accomplished using auger units 20 that extend from the tub 14 to the inlet 16 of the blending hopper 18. Each auger unit consists of an auger housing 22 that encases an auger screw (not shown). As the auger screw turns, the surfaces of the screw lift the proppant from the tub 14, through the auger housing 22 and upward to the inlet 16 of the blending hopper 18. At the inlet 16 of the blending hopper 18, the proppant is expelled from the auger housing 22 into the inlet 16 through a proppant chute 24.

One problem with the type of blender unit 10 shown and described in FIGS. 1-3 is that the auger screw quickly becomes worn, and must be replaced or serviced at frequent intervals. One reason for this is the course nature of the proppant, which causes friction between proppant particles and the auger screw. This friction degrades and wears down the material of the auger screw over time.

According to one embodiment of the invention, a system for delivering proppant to a blending hopper 118 is provided wherein the tub 114 is positioned above the inlet 116 of the blending hopper 118. Proppant can be delivered to the tub 114 via a proppant chute 126 attached to a conveyor assembly 128. A conveyor belt 130 collects sand from proppant containers 132 which deposit proppant directly from outlets (not shown) in the bottom of the containers 132 onto the conveyor belt 130. The conveyor belt 130 then conveys the proppant at an angle up to a height at least as high as the tub 114 through the conveyor assembly 128. Thereafter, the proppant is discharged from the conveyor belt 130, through the proppant chute 126, and into the tub 114.

Because the tub 114 is positioned directly above the blending hopper 118, the proppant can be fed into the blending hopper 118 through an outlet in the bottom of the tub 114 by gravity. Thus, there is no need for any auger units to transport the proppant from the tub 114 to the blending hopper 118.

Figure 4:
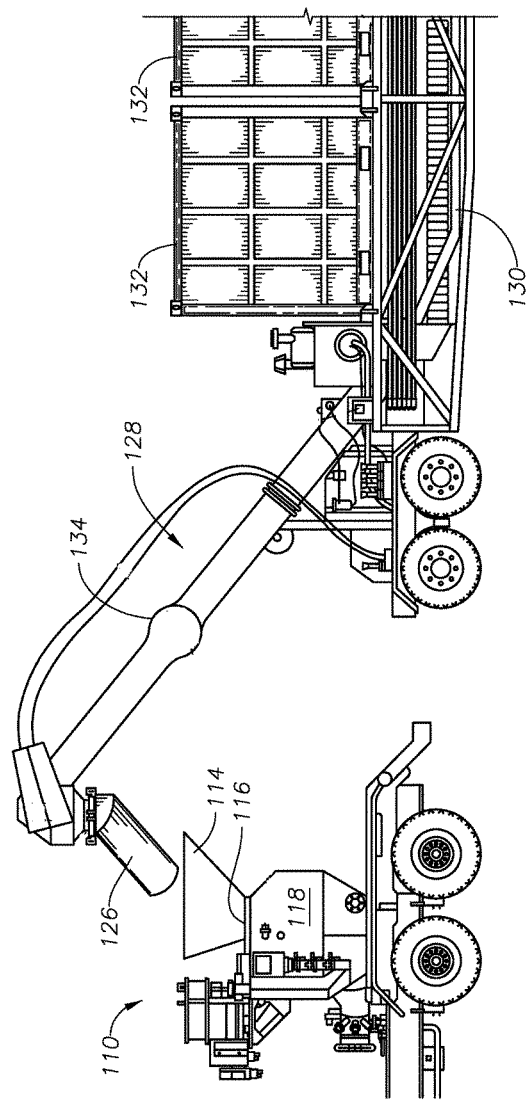
FIG. 4 is a side view of a blender unit and proppant delivery system according to an embodiment of the present invention.

As shown in FIG. 4, the conveyor assembly 128 can be collapsible and extendable around one or more joints 134, thereby allowing for compact storage of the components of the system during transport, as well as convenient use of the proppant chute 126 with conventional blending units, where the hopper is located close to the ground. In addition, in certain embodiments, the tub 114 may be removable from the top of the blending hopper 118, and can be stored directly on the trailer or elsewhere to reduce the height of the blender unit during transport.

Furthermore, although the embodiment of FIG. 4 illustrates the system of the present invention with the tub 114 mounted on top of the blending hopper 118 and without auger units. In some embodiments, other types of blending units may be used, such as those shown in FIGS. 1-3. In such embodiments, the tub 14 may remain close to the ground, and the proppant chute 114 can deliver proppant directly into the inlet 16 or the blending hopper 18 without first going through the tub 14. In fact, this can be accomplished with the auger units 20 in place, thereby allowing use of the present invention with any known blender unit.

Another aspect of the present invention includes a control system. Such a control system is configured to measure the flow of sand between the tub 114 and the blending hopper 118. In one example embodiment, the sand level in the tub 114 can be measured by a sensor. The rate of change of the sand level in the tub 114 can be monitored by weight. Simultaneously, another sensor may provide feedback to control mechanisms for the conveyor belt speed and the rate of discharge of the proppant from the container 132 onto the conveyor belt 130. This will help to insure that the amount of proppant in the tub 114 at any given time is maintained even as pump rates at the well, and thus the rate of proppant consumed by the well, varies.

This application is related to and claims priority to, and the benefit of, U.S. Provisional Application No. 62/050,752, filed Sep. 15, 2014, titled "System and Method for Delivering Proppant To A Blender," and U.S. Provisional Application No. 62/217,117, filed Sep. 11, 2015, titled "System and Method for Delivering Proppant To A Blender," each of which are incorporated herein by reference in their entireties.

In one embodiment, all of the above-described controls can be integrated in one place for ease of operation. Options may also exist for introducing additives to the mixture, such as guar or dry chemicals.

The invention claimed is:

1. A system for conveying proppant, the system comprising:
   a conveyor system having a conveyor belt and a control system to measure the flow of proppant a blending hopper, the conveyor belt receiving proppant from one or more containers having proppant stored therein distributed along the conveyor system and carrying the proppant away from the conveyors system;
   a conveyor assembly extending at an upward angle away from the one or more containers to thereby increase an elevation of the proppant positioned on the conveyor belt;
   a proppant chute positioned at an end of the conveyor assembly, the proppant chute having an opening to direct the proppant from the conveyor belt into the blending hopper, the proppant chute being positioned at a higher elevation than an inlet of the blending hopper such that the proppant exits the proppant chute into the blending hopper via gravity feed; and
   a tub positioned upstream of the inlet of the blending hopper to direct the proppant from the proppant chute into the blending hopper, wherein the tub is at a lower elevation than the proppant chute and is coupled to the blending hopper.

2. The system of claim 1, wherein the tub is removable from the blending hopper to reduce the vertical height of the blending hopper to facilitate transportation of the blending hopper.

3. The system of claim 1, wherein the one or more containers comprise a plurality of containers arranged in a side-by-side configuration along a length of the conveyor system.

4. The system of claim 1, wherein the control system comprises one or more sensors for measuring a weight of the proppant, a speed of the conveyor belt, a rate of discharge from the one or more containers, or a combination thereof.

5. A system to convey proppant, the system comprising:
   a conveyor system to receive and support one or more containers having proppant stored therein;
   a conveyor belt positioned beneath the one or more containers to receive the proppant dispensed from the one or more containers and to transport the proppant away from the one or more containers;
   a conveyor assembly positioned at an end of the conveyor system, the conveyor assembly having an inclined section that increases a vertical position of the conveyor belt relative to a ground plane;
   a proppant chute positioned at the end of the conveyor assembly, the proppant chute moveable to direct the proppant away from the conveyor belt;
   a blending hopper positioned proximate the conveyor system to receive and mix the proppant with one or more proppant fluids for injection into a well; and
   a tub positioned at and coupled to an inlet of the blending hopper between the blending hopper and the proppant chute, the tub being removable from the blending hopper and positioned at a lower elevation than the proppant chute when coupled to the blending hopper.

6. The system of claim 5, comprising a control system to measure a flow rate of proppant to the blending hopper via one or more sensors.

7. The system of claim 6, wherein a conveyor belt speed, a container dispersion rate, or a combination thereof is adjusted via the control system based on an output from the one or more sensors indicative of the flow rate.

8. The system of claim 6, wherein the one or more sensors is a weight sensor positioned in the tub to monitor the weight of proppant in the tub as the proppant flows to the blending hopper.

9. The system of claim 6, wherein the one or more sensors is a level sensor positioned in the tub to monitor a quantity of proppant in the tub as the proppant flows to the blending hopper.

10. The system of claim 6, wherein the control system adjusts one or more parameters of the conveyor system to maintain a substantially constant quantity of proppant in the tub during wellbore operations.

11. A method comprising:
    dispensing proppant from a container positioned on a conveyor system onto a conveyor belt;
    transporting the proppant, via the conveyor belt, away from the container and toward a conveyor assembly;
    transferring the proppant to a proppant chute such that the elevation of the proppant on the conveyor belt is increased;
    directing the proppant into a blending hopper via gravity feed; and
    directing the proppant into a tub positioned between the proppant chute and the blending hopper, the tub being removably coupled to the blending hopper and having a lower elevation than the proppant on the conveyor belt.

12. The method of claim 11, comprising adjusting a flow rate of the proppant to the blending hopper via a control system based on feedback from a weight sensor positioned in the tub, the weight sensor outputting a signal to the control system indicative of a quantity of proppant flowing to the blending hopper.

13. The method of claim 11, comprising adjusting a flow rate of the proppant from the container via a control system based on feedback from one or more sensors positioned downstream of the container.

14. The method of claim 13, comprising adjusting a speed of the conveyor belt via feedback from the one or more sensors.

* * * * *